(12) United States Patent
Sugiura et al.

(10) Patent No.: US 8,415,068 B2
(45) Date of Patent: Apr. 9, 2013

(54) FUEL CELL

(75) Inventors: Seiji Sugiura, Utsunomiya (JP); Shuhei Goto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1528 days.

(21) Appl. No.: 10/721,616

(22) Filed: Nov. 24, 2003

(65) Prior Publication Data

US 2004/0106028 A1 Jun. 3, 2004

(30) Foreign Application Priority Data

Nov. 26, 2002 (JP) ................................. 2002-342564
Nov. 14, 2003 (JP) ................................. 2003-385025

(51) Int. Cl.
*H01M 2/38* (2006.01)
(52) U.S. Cl. ........ 429/457; 429/455; 429/456; 429/458; 429/514; 429/518
(58) Field of Classification Search .................... 429/34, 429/39, 455–458, 514, 518
See application file for complete search history.

(56) References Cited

U.S. PATENT DOCUMENTS 6,403,247 B1 *  6/2002  Guthrie et al. .................. 429/34
2001/0019793 A1  9/2001  Tsuyoshi
2001/0033954 A1 * 10/2001  Gyoten et al. ................... 429/21
2003/0064266 A1 *  4/2003  Ogami et al. ................... 429/32

FOREIGN PATENT DOCUMENTS

| JP | 2001-250568 | 9/2001 |
| JP | 2001-283879 | 10/2001 |
| JP | 2001-319676 | 11/2001 |

OTHER PUBLICATIONS

Japanese Office Action for Application No. 2003-385025, dated Sep. 25, 2007.

* cited by examiner

*Primary Examiner* — Patrick Ryan
*Assistant Examiner* — Ben Lewis
(74) *Attorney, Agent, or Firm* — Nelson Mullins Riley & Scarborough LLP; Anthony A. Laurentano

(57) ABSTRACT

A coolant supply passage, a coolant discharge passage, and an air-releasing passage extend through first and second metal plates of a metal separator in a stacking direction of the first and second metal plates. The coolant supply passage and the coolant discharge passage are provided at vertically middle positions of opposite horizontal ends of the separator. A coolant flow field is connected between the coolant supply passage and the coolant discharge passage. The air-releasing passage for releasing air from the coolant flow field is formed above the coolant discharge passage. At least part of the air-releasing passage is positioned above the top of the coolant flow field.

4 Claims, 13 Drawing Sheets

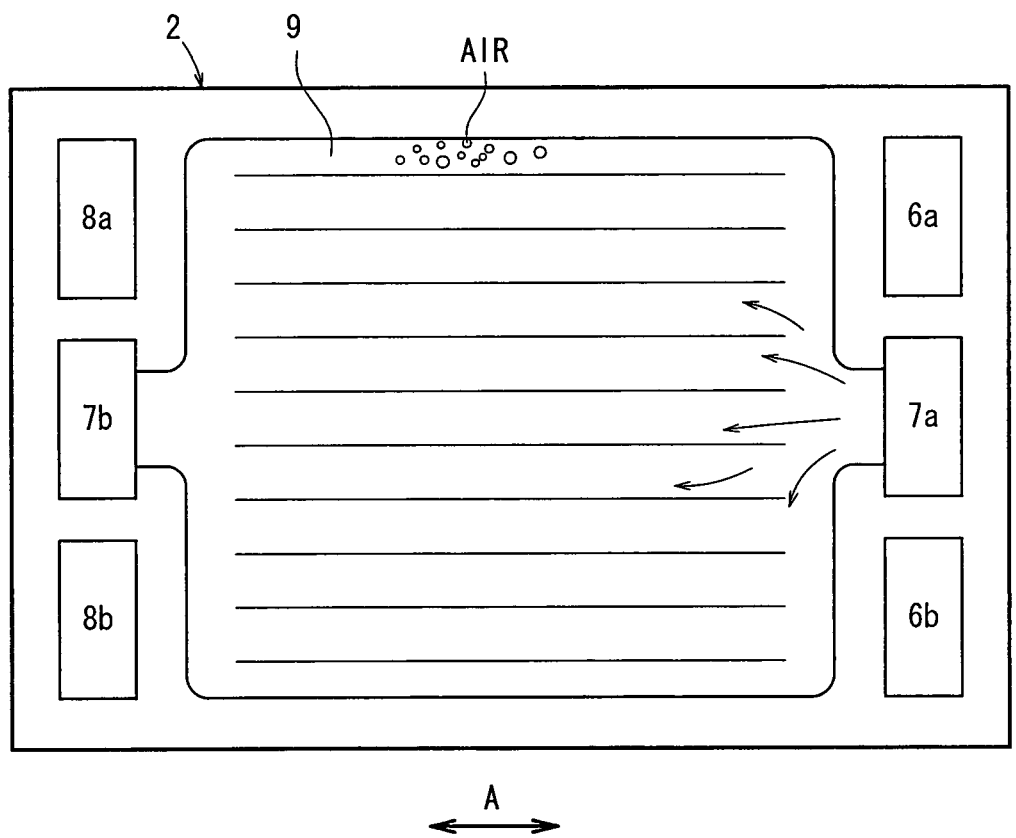

US 8,415,068 B2

FUEL CELL

BACKGROUND OF THE INVENTION

1. Field of the Invention

The present invention relates to a fuel cell including an electrolyte electrode assembly, and separators for sandwiching the electrolyte electrode assembly. The electrolyte electrode assembly includes a pair of electrodes and an electrolyte interposed between the electrodes.

2. Description of the Related Art

For example, a solid polymer electrolyte fuel cell employs a membrane electrode assembly (MEA) which includes two electrodes (anode and cathode), and an electrolyte membrane interposed between the electrodes. Each of the electrodes comprises an electrode catalyst and a porous carbon. The electrolyte membrane is a polymer ion exchange membrane. The membrane electrode assembly is interposed between separators (bipolar plates). The membrane electrode assembly and the separators make up a unit of a fuel cell (unit cell) for generating electricity. A predetermined number of the fuel cells are stacked together to form a fuel cell stack.

In the fuel cell, a fuel gas (reactant gas) such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. A gas chiefly containing oxygen (oxygen-containing gas) or air is supplied to the cathode. At the cathode, the hydrogen ions from the anode combine with the electrons and oxygen to produce water.

In the fuel cell, a fuel gas flow field is formed on a surface of the separator facing the anode for supplying the fuel gas to the anode. An oxygen-containing gas flow field is formed on a surface of the separator facing the cathode for supplying the oxygen-containing gas to the cathode. Further, a coolant flow field is provided between adjacent surfaces of the separators such that a coolant flows along the separators.

Generally, fluid supply passages and fluid discharge passages extend through the fuel cell stack in the stacking direction of the separators. The fuel gas, the oxygen-containing gas, and the coolant flow into the fluid supply passages, and are supplied to the fuel gas flow field, the oxygen-containing gas flow field, and the coolant flow field, respectively. Then, the fuel gas, the oxygen-containing gas, and the coolant flow into the fluid discharge passages, respectively.

Specifically, U.S. Patent Application Publication US 2001/0019793 A1 discloses a unit of the fuel cell as shown in FIG. 12. A unit cell 3 includes a membrane electrode assembly 1 and collector plates 2 stacked on both surfaces of the membrane electrode assembly 1. The membrane electrode assembly 1 includes a pair of reaction electrodes 5, and an electrolyte membrane 4 interposed between the reaction electrodes 5.

At one horizontal end of the collector plate 2 in a direction indicated by an arrow X, an oxygen-containing gas supply passage 6a, a coolant supply passage 7a, and an oxygen-containing gas discharge passage 6b are arranged vertically. At the other horizontal end of the collector plate 2 in the direction indicated by the arrow X, a fuel gas supply passage 8a, a coolant discharge passage 7b, and a fuel gas discharge passage 8b are arranged vertically.

According to the disclosure of U.S. Patent Application Publication US 2001/0019793 A1, the coolant supply passage 7a is provided at a vertically middle position at one horizontal end of the collector plate 2. The coolant discharge passage 7b is provided at a vertically middle position at the other horizontal end of the collector plate 2. As shown in FIG. 13, a coolant flow field 9 is formed on a surface of the collector plate 2. The coolant flow field 9 comprises grooves extending horizontally for connecting the coolant supply passage 7a and the coolant discharge passage 7b.

In the fuel cell system, when the coolant containing air is supplied into the coolant flow field 9 from the coolant supply passage 7a, or when the coolant is injected into the coolant flow field 9 just after assembling the fuel cell, the air in the coolant is likely to move upwardly in the coolant flow field 9, and the air in the coolant may be trapped in an upper region of the coolant flow field 9 undesirably. Therefore, the cooling function is not properly carried out in the upper region. The entire power generation surface of the unit cell 3 can not be cooled uniformly.

SUMMARY OF THE INVENTION

A main object of the present invention is to provide a fuel cell having a desirable cooling function with a simple structure in which air is discharged from the coolant flow field reliably.

According to the present invention, a fuel cell comprises an electrolyte electrode assembly including a pair of electrodes and an electrolyte interposed between the electrodes, and separators for sandwiching the electrolyte electrode assembly. A coolant supply passage, and a coolant discharge passage extend through the fuel cell in a stacking direction of the fuel cell. A coolant flow field connected between the coolant supply passage and the coolant discharge passage is formed along a surface of the separator. The coolant supply passage is provided at a vertically middle position of one horizontal end of the separator, and the coolant discharge passage is provided at a vertically middle position of the other horizontal end of the separator.

In the fuel cell, when the coolant containing air is supplied from the coolant supply passage into the coolant flow field, the air moves upwardly while the coolant is flowing in the coolant flow field toward the coolant discharge passage. An air-releasing passage for releasing air from the coolant flow field extends through an upper position of the other horizontal end of the separator in the stacking direction such that at least part of the air-releasing passage is positioned above a top of the coolant flow field.

In this manner, the air in the coolant flow field is smoothly and reliably discharged into the air-releasing passage. It is possible to prevent the air from being trapped in the coolant flow field. Thus, the coolant is supplied to substantially the entire surface of the coolant flow field. With the simple structure, the cooling efficiency of the fuel cell is improved dramatically.

The top (uppermost portion) of the coolant flow field is inclined upwardly toward the air-releasing passage. The air in the coolant flow filed moves smoothly toward the air-releasing passage by the inclination at the top of the coolant flow field. Thus, the air is discharged from the coolant flow field into the air-releasing passage efficiently.

The air-releasing passage is provided above the coolant discharge passage. Since the air in the coolant is likely to move upwardly to the air-releasing passage positioned above the coolant discharge passage while the coolant is flowing toward the coolant discharge passage, the air is discharged into the air-releasing passage reliably.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 13 is a view showing a coolant flow field of the conventional fuel cell.

DESCRIPTION OF THE PREFERRED EMBODIMENTS

Figure 1:
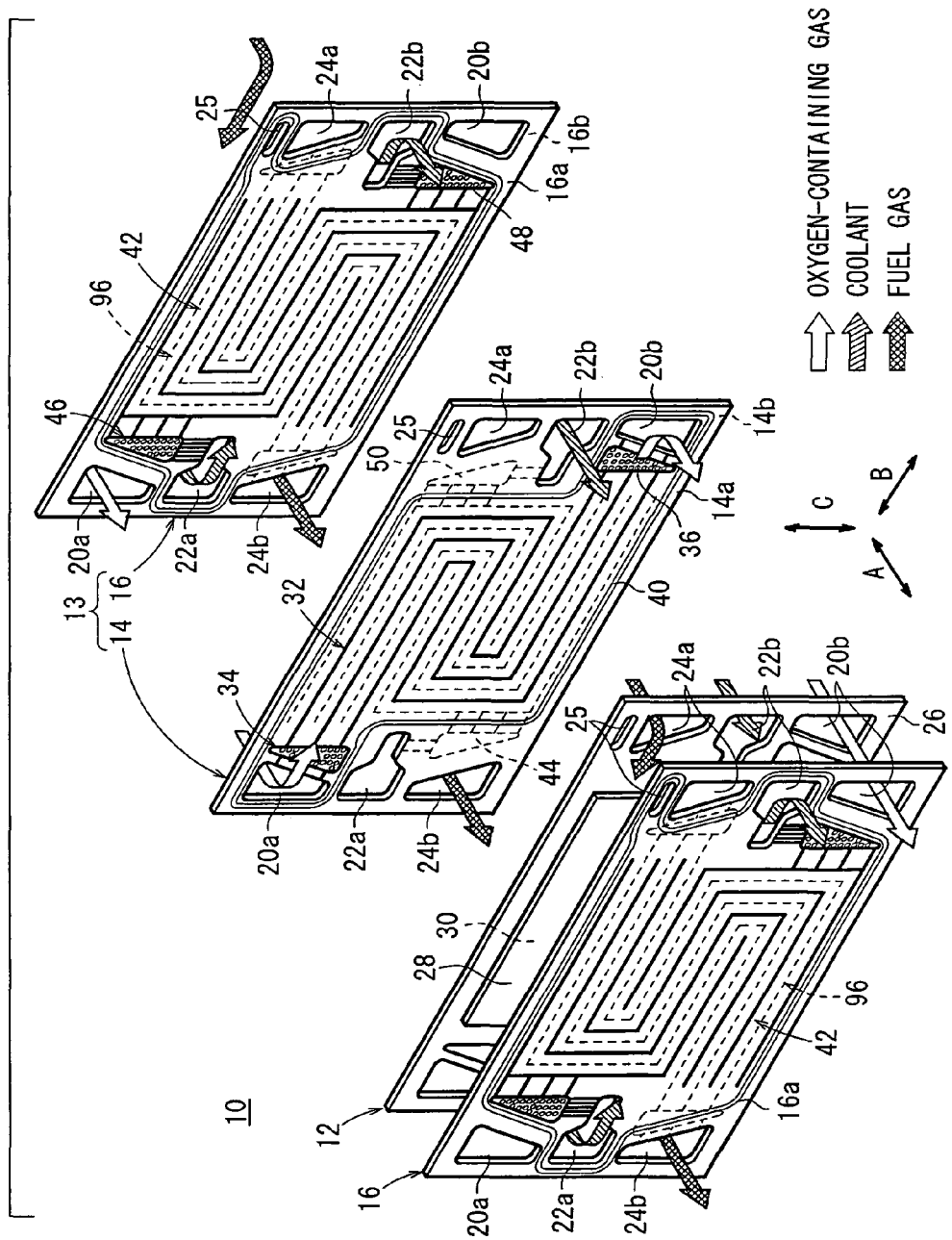
FIG. 1 is an exploded view showing main components of a fuel cell according to a first embodiment of the present invention.
Figure 2:
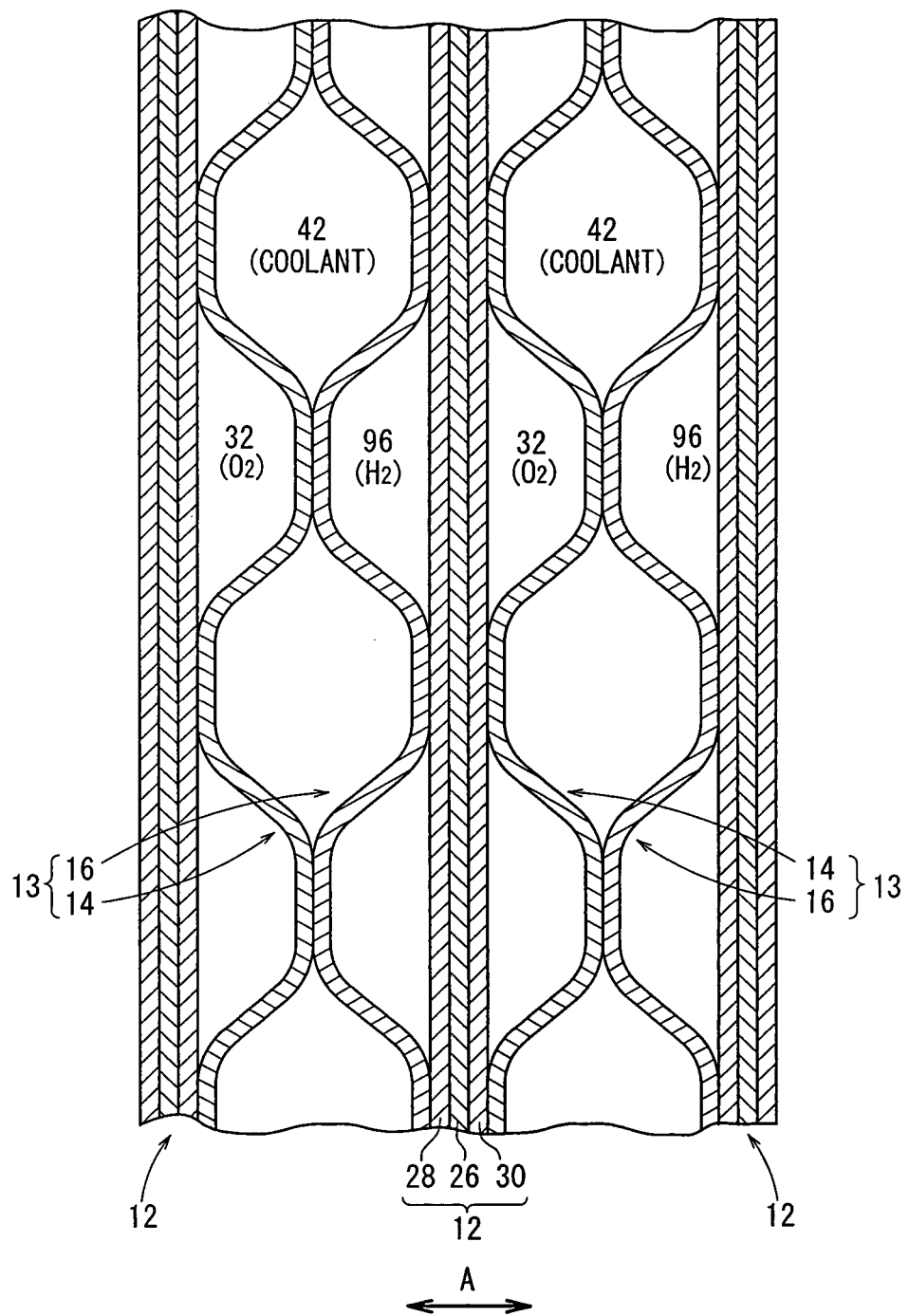
FIG. 2 is a cross sectional view showing a part of the fuel cell.

FIG. 1 is an exploded view showing main components of a fuel cell 10 according to a first embodiment of the present invention. FIG. 2 is a cross sectional view showing a part of the fuel cell 10.

The fuel cell 10 includes a membrane electrode assembly (electrolyte electrode assembly) 12 and metal separators 13 for sandwiching the membrane electrode assembly 12. Each of the metal separators 13 includes first and second plates 14, 16, which are stacked together.

As shown in FIG. 1, at one horizontal end of the fuel cell 10 in a direction indicated by an arrow B, an oxygen-containing gas supply passage (reactant gas supply passage) 20*a* for supplying an oxygen-containing gas, a coolant supply passage 22*a* for supplying a coolant, and a fuel gas discharge passage 24*b* for discharging a fuel gas such as a hydrogen-containing gas are arranged vertically in a direction indicated by an arrow C. The oxygen-containing gas supply passage 20*a*, the coolant supply passage 22*a*, and the fuel gas discharge passage (reactant gas discharge passage) 24*b* extend through the fuel cell 10 in a stacking direction indicated by an arrow A.

As shown in FIG. 1, at the other horizontal end of the fuel cell 10 in the direction indicated by the arrow B, a fuel gas supply passage (reactant gas supply passage) 24*a* for supplying the fuel gas, a coolant discharge 22*b* for discharging the coolant, and an oxygen-containing gas discharge passage (reactant gas discharge passage) 20*b* for discharging the oxygen-containing gas are arranged vertically in the direction indicated by the arrow C. The fuel gas supply passage 24*a*, the coolant discharge passage 22*b*, and the oxygen-containing gas discharge passage 20*b* extend through the fuel cell 10 in the direction indicated by the arrow A.

The coolant supply passage 22*a* is provided at a vertically middle position of one horizontal end of the fuel cell 10, and the coolant discharge passage 22*b* is provided at a vertically middle position of the other horizontal end of the fuel cell 10. At an upper position at the other horizontal end of the fuel cell 10, an air-releasing passage 25 extends through the fuel cell 10 in the stacking position, at a position above the fuel gas supply passage 24*a*. At least part of the air-releasing passage 25 is positioned above the top (uppermost portion) of a coolant flow field 42 as described later.

The membrane electrode assembly 12 comprises an anode 28, a cathode 30, and a solid polymer electrolyte membrane 26 interposed between the anode 28 and the cathode 30. The solid polymer electrolyte membrane 26 is formed by impregnating a thin membrane of perfluorosulfonic acid with water, for example. Each of the anode 28 and cathode 30 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 28 and the electrode catalyst layer of the cathode 30 are fixed to both surfaces of the solid polymer electrolyte membrane 26, respectively.

Figure 3:
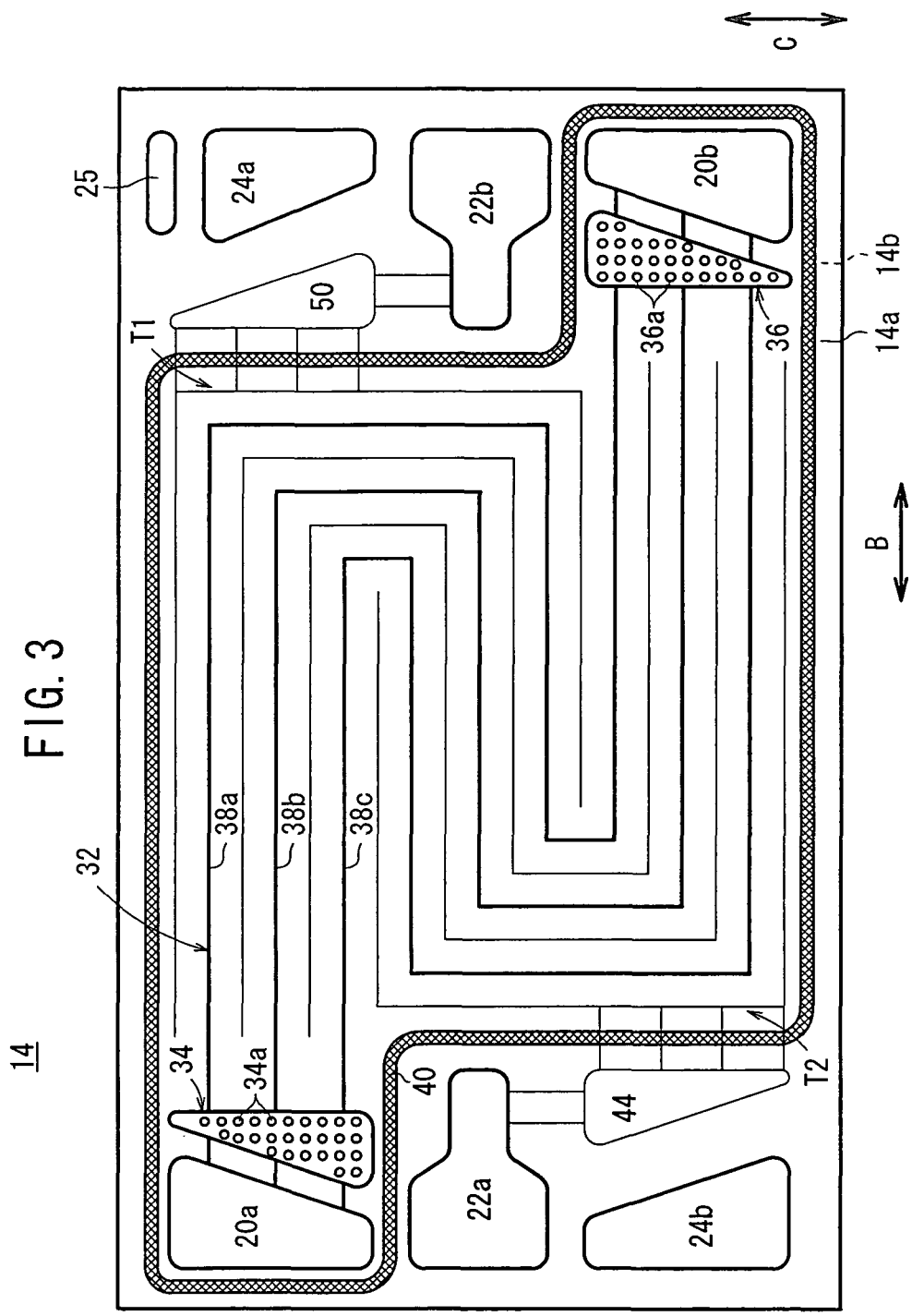
FIG. 3 is a view showing one surface of a first metal plate.

As shown in FIGS. 1 and 3, the first metal plate 14 has an oxygen-containing gas flow field 32 on its surface 14*a* facing the membrane electrode assembly 12. The oxygen-containing gas flow field 32 is connected to the oxygen-containing gas supply passage 20*a* at one end, and connected to the oxygen-containing gas discharge passage 20*b* at the other end. A substantially right triangular inlet buffer 34 is provided near the oxygen-containing gas supply passage 20*a*, and a substantially right triangular outlet buffer 36 is provided near the oxygen-containing gas discharge passage 20*b*. The inlet buffer 34 and the outlet buffer 36 are formed substantially symmetrically with each other. The inlet buffer 34 and the outlet buffer 36 include a plurality of bosses 34*a*, 36*a*, respectively.

The inlet buffer 34 and the outlet buffer 36 are connected by three oxygen-containing gas flow grooves 38*a*, 38*b*, 38*c*. The oxygen-containing gas flow grooves 38*a* through 38*c* extend in parallel with each other in a serpentine pattern for allowing the oxygen-containing gas to flow back and forth in the direction indicated by the arrow B, and flows in the direction indicated by the arrow C. The oxygen-containing gas flow grooves 38*a* through 38*c* have two turn regions T1, T2, for example.

A line seal 40 is provided on the surface 14*a* of the first metal plate 14 around the oxygen-containing gas supply passage 20*a*, the oxygen-containing gas discharge passage 20*b*, and the oxygen-containing gas flow field 32 for preventing leakage of the oxygen-containing gas.

Figure 4:
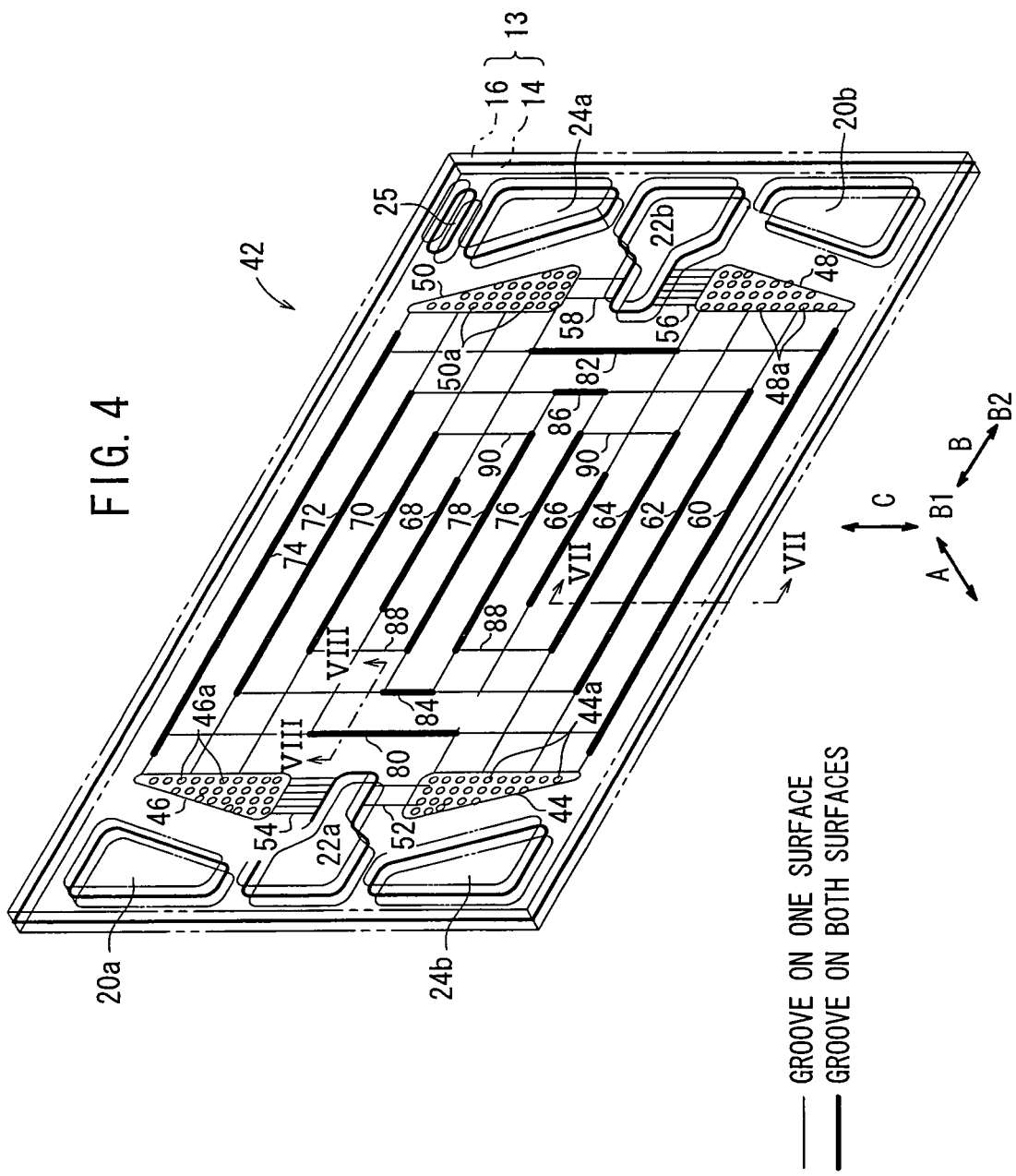
FIG. 4 is a perspective view showing a coolant flow field formed in a metal separator.

The coolant flow field 42 is formed between a surface 14*b* of the first metal plate 14 and a surface 16*a* of the second metal plate 16 when the first metal plate 14 and the second metal plate 16 are combined together. As shown in FIG. 4, for example, substantially right rectangular inlet buffers 44, 46 and substantially right rectangular outlet buffers 48, 50 are provided in the coolant flow field 42. The inlet buffers 44, 46 are provided at opposite sides of the coolant supply passage 22*a* in the direction indicated by the arrow C, and the outlet buffers 48, 50 are provided at opposite sides of the coolant discharge passage 22*b* in the direction indicated by the arrow C.

The inlet buffer 44 and the outlet buffer 50 are substantially symmetrical with each other. The inlet buffer 46 and the outlet buffer 48 are substantially symmetrical with each other. A plurality of bosses 44a, 46a, 48a, and 50a, are formed on the inlet buffer 44, the inlet buffer 46, the outlet buffer 48, and the outlet buffer 50, respectively.

The coolant supply passage 22a is connected to the inlet buffer 44 through a first inlet connection passage 52, and connected to the inlet buffer 46 through a second inlet connection passage 54. The coolant discharge passage 22b is connected to the outlet buffer 48 through a first outlet connection passage 56, and connected to the outlet buffer 50 through a second outlet connection passage 58. The first inlet connection passage 52 comprises, for example, two flow grooves, and the second inlet connection passage 54 comprises, for example, six flow grooves. Similarly, the first outlet connection passage 56 comprises six flow grooves, and the second outlet connection passage 58 comprises two flow grooves.

The number of flow grooves in the first inlet connection passage 52 is not limited to "two", and the number of flow grooves in the second inlet connection passage 54 is not limited to "six". Similarly, the number of flow grooves in the first outlet connection passage 56 is not limited to "six", and the number of flow grooves in the second outlet connection passage 58 is not limited to "two". The number of flow grooves in the first inlet connection passage 52 may be the same as the number of flow grooves in the second inlet connection passage 54, and the number of flow grooves in the first outlet connection passage 56 may be same as the number of flow grooves in the second outlet connection passage 58.

The inlet buffer 44 and the outlet buffer 48 are connected by straight flow grooves 60, 62, 64, and 66 extending in the direction indicated by the arrow B. The inlet buffer 46 and the outlet buffer 50 are connected by straight flow grooves 68, 70, 72, and 74 extending in the direction indicated by the arrow B. Straight flow grooves 76, 78 extending in the direction indicated by the arrow B for a predetermined distance are provided between the straight flow groove 66 and the straight flow groove 68.

The straight flow grooves 60 through 74 are connected by straight flow grooves 80, 82 extending in the direction indicated by the arrow C. The straight flow grooves 62 through 72, 76 and 78 are connected with each other through straight flow grooves 84, 86 which are extending in the direction indicated by the arrow C. The straight flow grooves 64, 66, and 76 and the straight flow grooves 68, 70, and 78 are connected with each other through straight flow grooves 88, 90 which are extending in the direction indicated by the arrow C, respectively.

Figure 5:
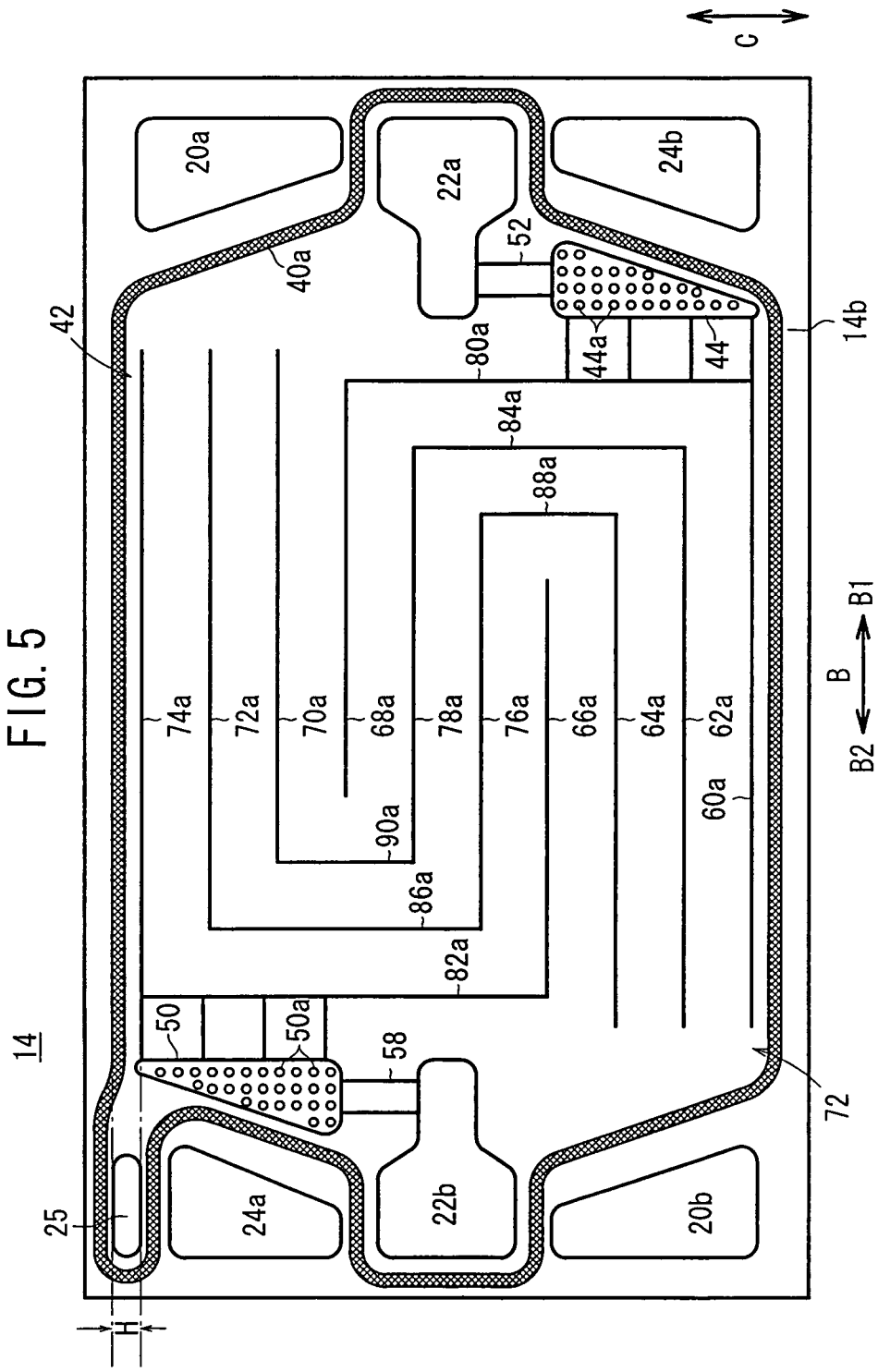
FIG. 5 is a view showing the other surface of the first metal plate.

The coolant flow field 42 is partially defined by grooves on the surface 14b of the first metal plate 14, and partially defined by grooves on the surface 16a of the second metal plate 16. The coolant flow field 42 is formed between the first metal plate 14 and the second metal plate 16 when the first metal plate 14 and the second metal plate 16 are combined together. As shown in FIG. 5, the grooves of the coolant flow field 42 on the surface 14b has a pattern corresponding to the pattern of the oxygen-containing gas flow field 32. The grooves of the coolant flow field 42 on the surface 14b form protrusions defining the oxygen-containing gas flow field 32 on the surface 16a.

In FIG. 5, protrusions on the surface 14b formed by the grooves of the oxygen-containing gas flow field 32 on the surface 14a are not shown for ease of understanding. Similarly, in FIG. 6, protrusions on the surface 16b formed by the grooves of the fuel gas flow field 96 on the surface 16a are not shown.

The inlet buffer 44 connected to the coolant supply passage 22a through the first inlet connection passage 52 comprising the two flow grooves is provided on the surface 14b. Further, the outlet buffer 50 connected to the coolant discharge passage 22b through the second outlet connection passage 58 comprising the two flow grooves is provided on the surface 14b.

Grooves 60a, 62a, 64a, and 66a connected to the inlet buffer 44 extend in the direction indicated by the arrow B for a predetermined distance. The grooves 60a, 62a, 64a, and 66a include a turn region corresponding to the turn region T2 of the oxygen-containing gas flow grooves 38a through 38c, and are not formed in an area where the outlet buffer 36 is formed. Grooves 68a, 70a, 72a, and 74a connected to the outlet buffer 50 extend in the direction indicated by the arrow B. The grooves 68a, 70a, 72a, and 74a include a turn region corresponding to the turn region T1 of the oxygen-containing gas flow grooves 38a through 38c, and are not formed in an area where the inlet buffer 34 is formed.

The grooves 60a through 78a are part of straight flow grooves 60 through 78, respectively. Grooves 80a through 90a of the straight flow grooves 80 through 90 extending in the direction indicated by the arrow C for a predetermined distance corresponding to the serpentine oxygen-containing gas flow grooves 38a through 38c. An air-releasing passage 25 is provided above the coolant flow field 42. The top position of the air-releasing passage 25 is spaced from the coolant flow field 42 by a distance H (see FIGS. 5 and 6).

Figure 6:
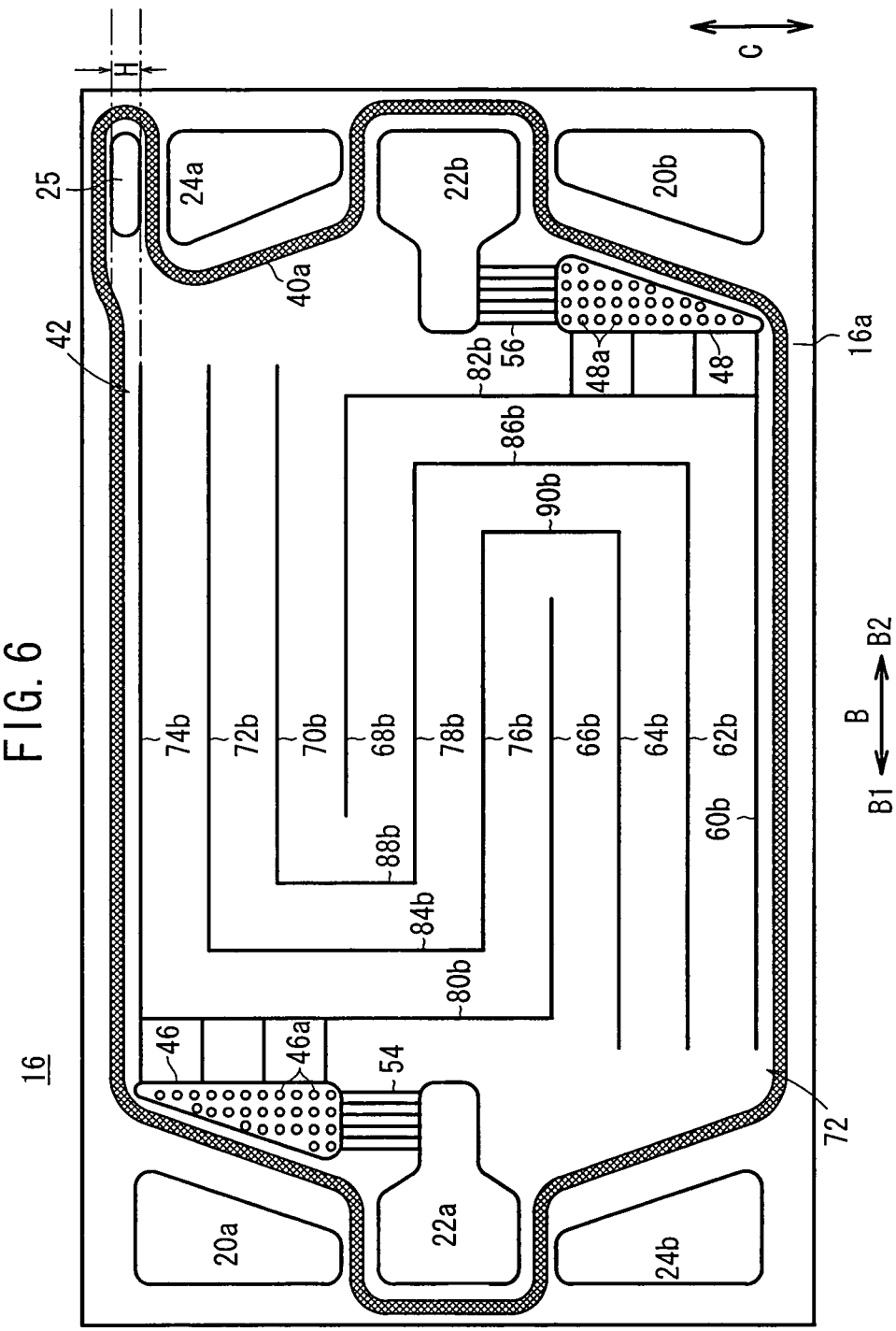
FIG. 6 is a view showing one surface of a second metal plate.

As shown in FIG. 6, the coolant flow field 42 is partially defined by grooves on the surface 16a of the second metal plate 16. The grooves of the coolant flow field 42 on the surface 16b have a pattern corresponding to the pattern of the fuel gas flow field 96 as described later. The inlet buffer 46 connected to the coolant supply passage 22a and the outlet buffer 48 connected to the coolant discharge passage 22b are provided on the surface 16a of the second metal plate 16.

Grooves 68b through 74b of the straight flow grooves 68 through 74 are connected to the inlet buffer 46. The grooves 68b through 74b extend in the direction indicated by the arrow B for a predetermined distance. Grooves 60b through 66b of the straight flow grooves 60 through 66 extending in a predetermined pattern are connected to the outlet buffer 48. Grooves 80b through 90b of the straight flow grooves 80 through 90 extend in the direction indicated by the arrow C on the surface 16a.

As shown in FIG. 4, the flow grooves of the coolant flow field 42 are partially formed by combining the flow grooves 60a through 78 and the grooves 60b through 78b formed on both surfaces together such that the cross sectional area of the flow groove formed by the pair of grooves on both surfaces is twice as large as the cross sectional area of the flow groove formed by the single groove on one surface (see FIG. 4).

The straight flow grooves 80 through 90 are partially formed by combining grooves on both surfaces 14b, 16a of the first and second metal plates 14, 16. A line seal 40a is provided between the surface 14b of the first metal plate 14 and the surface 16a of the second metal plate 16 around the coolant supply passage 22a, the coolant discharge passage 22b, the air-releasing passage 25, and the coolant flow field 42.

As shown in FIG. 1, when the first metal plate 14 and the second metal plate 16 of the metal separator 13 are combined together, the inlet buffers 34, 46 are overlapped with each other, and the outlet buffers 36, 48 are overlapped with each other.

Figure 7:
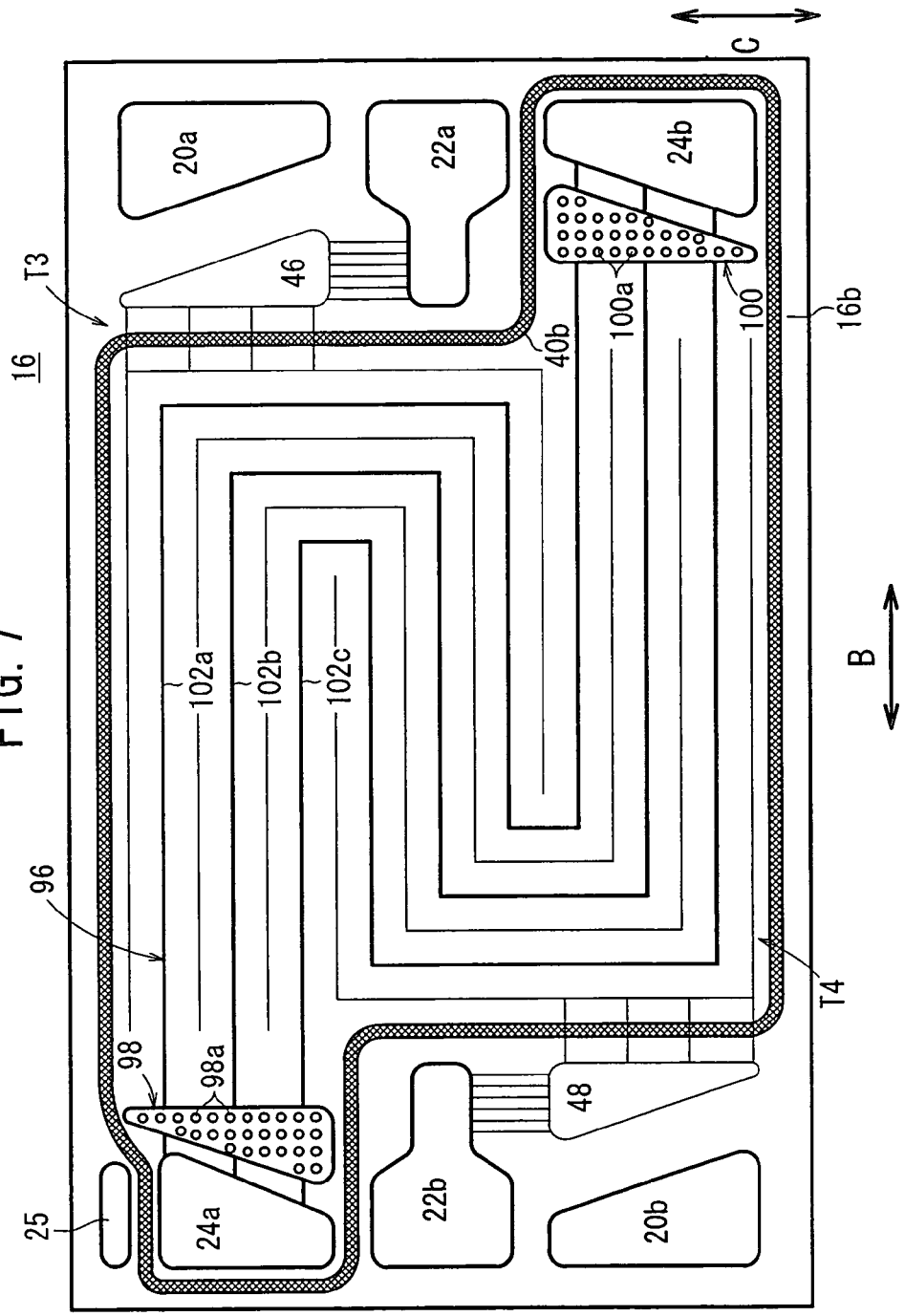
FIG. 7 is a view showing the other surface of the second metal plate.

As shown in FIG. 7, the second metal plate 16 has a fuel gas flow field 96 on its surface 16b facing the membrane electrode assembly 12. A substantially right rectangular inlet buffer 98 is provided near the fuel gas supply passage 24a, and a substantially right rectangular outlet buffer 100 is provided near the fuel gas discharge passage 24b.

The inlet buffer 98 and the outlet buffer 100 are substantially symmetrically with each other. The inlet buffer 98 and the outlet buffer 100 include a plurality of bosses 98a, 10a, respectively. For example, the inlet buffer 98 and the outlet buffer 100 are connected by three fuel gas grooves 102a, 102b, 102c. The fuel gas grooves 102a through 102c extend in parallel with each other in a serpentine pattern for allowing the fuel gas to flow back and forth in the direction indicated by the arrow B, and flows in the direction indicated by the arrow C. The fuel gas grooves 102a through 102c have two turn regions T3, T4, for example.

A line seal 40b is provided on the surface 16b of the second metal plate 16 around the fuel gas supply passage 24a, the fuel gas discharge passage 24b, and the fuel gas flow field 96 for preventing leakage of the fuel gas.

As shown in FIGS. 5 and 7, when the first metal plate 14 and the second metal plate 16 are stacked together, the inlet buffer 44 on the surface 14b of the first metal plate 14 and the outlet buffer 100 on the surface 16b of the second metal plate are overlapped with each other. The outlet buffer 50 on the surface 14b and the inlet buffer 98 on the surface 16b are overlapped with each other.

Next, operation of the fuel cell 10 according to the first embodiment will be described.

In operation, as shown in FIG. 1, an oxygen-containing gas such as air is supplied to the oxygen-containing gas supply passage 20a, a fuel gas such as a hydrogen-containing gas is supplied to the fuel gas supply passage 24a, and a coolant such as pure water, an ethylene glycol or an oil are supplied to the coolant supply passage 22a.

The oxygen-containing gas flows from the oxygen-containing gas supply passage 20a into the oxygen-containing gas flow field 32 of the first metal plate 14. As shown in FIG. 3, the oxygen-containing gas flows through the inlet buffer 34, and is distributed into the oxygen-containing gas flow grooves 38a through 38c. The oxygen-containing gas flows through the oxygen-containing gas flow grooves 38a through 38c in a serpentine pattern along the cathode 30 of the membrane electrode assembly 12 to induce a chemical reaction at the cathode 30.

The fuel gas flows from the fuel gas supply passage 24a into the fuel gas flow field 96 of the second metal plate 16. As shown in FIG. 7, the fuel gas flows through the inlet buffer 98, and is distributed into the fuel gas flow grooves 102a through 102c. The fuel gas flows through the fuel gas flow grooves 102a through 102c in a serpentine pattern along the anode 28 of the membrane electrode assembly 12 to induce a chemical reaction at the anode 28.

In the membrane electrode assembly 12, the oxygen-containing gas supplied to the cathode 30, and the fuel gas supplied to the anode 28 are consumed in the electrochemical reactions at catalyst layers of the cathode 30 and the anode 28 for generating electricity.

After the oxygen-containing gas is consumed at the cathode 30, the oxygen-containing gas flows into the oxygen-containing gas discharge passage 20b through the outlet buffer 36. Similarly, after the fuel gas is consumed at the anode 28, the fuel gas flows into the fuel gas discharge passage 24b through the outlet buffer 100.

The coolant supplied to the coolant supply passages 22a flows into the coolant flow field 42 between the first and second metal plates 14, 16. As shown in FIG. 4, the coolant from the coolant supply passage 22a flows through the first and second inlet connection passages 52, 54 in the direction indicated by the arrow C, and flows into the inlet buffers 44, 46.

The coolant is distributed from the inlet buffers 44, 46 into the straight flow grooves 60 through 66, and 68 through 74, and flows horizontally in the direction indicated by the arrow B. The coolant also flows through the straight flow grooves 80 through 90, 76, and 78. Thus, the coolant is supplied to the entire power generation surface of the membrane electrode assembly 12. Then, the coolant flows through the buffers 48, 50, and flows into the coolant discharge passages 22b through the outlet connection passages 56, 58.

In the first embodiment, as shown in FIGS. 4 through 6, the air-releasing passage 25 provided above the coolant discharge passage 22b extend through the first and second plates 14, 16 of the metal separator 13 in the stacking direction. The air-releasing passage 25 is positioned above the top (uppermost portion) of the coolant flow field 42. The top position of the air-releasing passage 25 is spaced from the coolant flow field 42 by the distance H.

If the coolant containing air is supplied to the coolant flow field 42 from the coolant supply passage 22a provided at a vertically middle position of one horizontal end (in the direction indicated by the arrow B1) of the metal separator 13, the air is likely to move upwardly while the coolant is flowing toward the coolant discharge passage 22b provided at a vertically middle position of the other horizontal end (in the direction indicated by the arrow B2) of the metal separator 13. The air in the coolant flowing in the direction indicated by the arrow B2 is released into the air-releasing passage 25 provided above the coolant flow field 42.

After the fuel cell 10 is assembled, at the time of injecting the coolant into the coolant flow field 42, the air in the coolant moves upwardly in the coolant flow field 42, and the air is released into the air-releasing passage 25 positioned above the coolant flow field 42.

In this manner, the air moving in the coolant flow field 42 is smoothly and reliably discharged into the air-releasing passage 25. It is possible to prevent the air from being trapped in the coolant flow field 42. Thus, the coolant is supplied to the substantially entire surface of the coolant flow field 42. With the simple structure, the cooling efficiency of the fuel cell 10 is improved dramatically.

The air-releasing passage 25 is provided above the coolant discharge passage 22b, and above the top of the coolant flow field 42. Since the air in the coolant moves toward the air-releasing passage 25b above the coolant discharge passage 22b while the coolant is flowing toward the coolant discharge passage 22b, the air is easily collected from the air-releasing passage 25. The air is reliably discharged from the coolant flow field 42 into the air-releasing passage 25.

The coolant supply passage 22a is provided at a vertically middle position of one horizontal end of the separator 13, and the coolant discharge passage 22b is provided at a vertically middle position of the other horizontal end of the separator 13. The oxygen-containing gas supply passage 20a and the fuel gas supply passage 24a are provided at upper positions of opposite horizontal ends of the separator 13, and the oxygen-containing gas discharge passage 20b and the fuel gas discharge passage 24b are provided at lower positions of opposite horizontal ends of the separator 13.

Since the oxygen-containing gas discharge passage 20b and the fuel gas discharge passage 24b are provided at the lower positions, water is likely to be discharged smoothly from the oxygen-containing gas flow field 32 and the fuel gas flow field 96 into the oxygen-containing gas discharge passage 20b and the fuel gas discharge passage 24b, respectively. Since the water is discharged smoothly from the fuel cell 10, the desired power generation performance of the fuel cell 10 is maintained.

Figure 8:
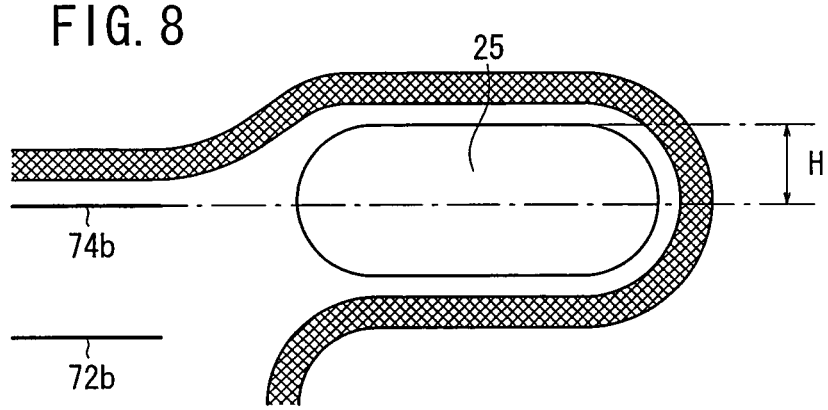
FIG. 8 is a view in which a position of an air-releasing passage is changed.

In the first embodiment can be carried out simply by providing the air-releasing passage 25 such that the top position of the air-releasing passage 25 is spaced upwardly from the top of the coolant flow field 42 by the distance H. For example, as shown in FIG. 8, even if the bottom of the air-releasing passage 25 is positioned below the top of the coolant flow field 42, the advantage of the first embodiment can be achieved.

Figure 9:
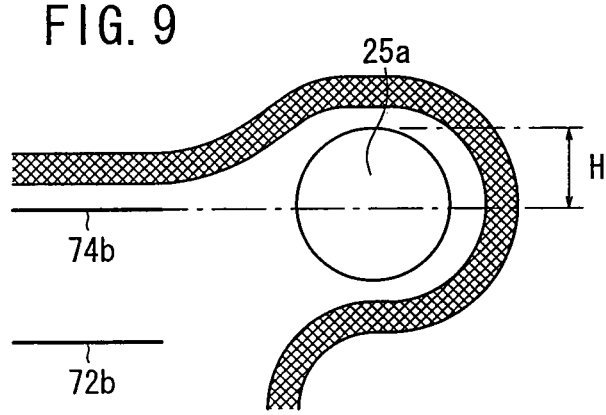
FIG. 9 is a view showing an air-releasing passage having a circular cross section.
Figure 10:
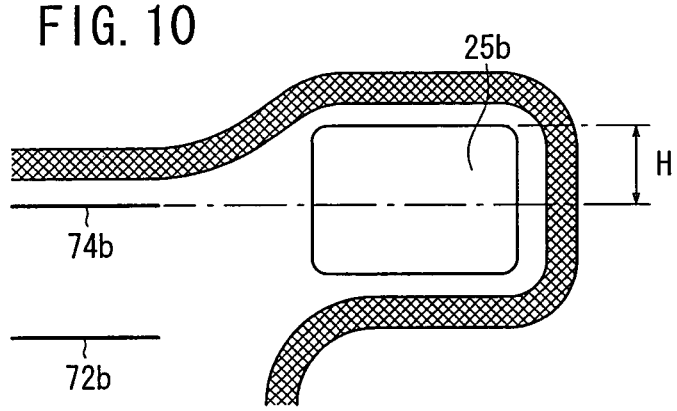
FIG. 10 is a view showing an air-releasing passage having a rectangular cross section.

In the first embodiment, the air-releasing passage 25 has an oblong cross section as an example. However, the shape of the air-releasing passage 25 is not limited to have the oblong cross section. The shape of the air-releasing passage 25 can be changed freely, depending on the application. For example, FIG. 9 shows an air-releasing passage 25a having a circular cross section, and FIG. 10 shows an air-releasing passage 25b having a rectangular cross section.

Figure 11:
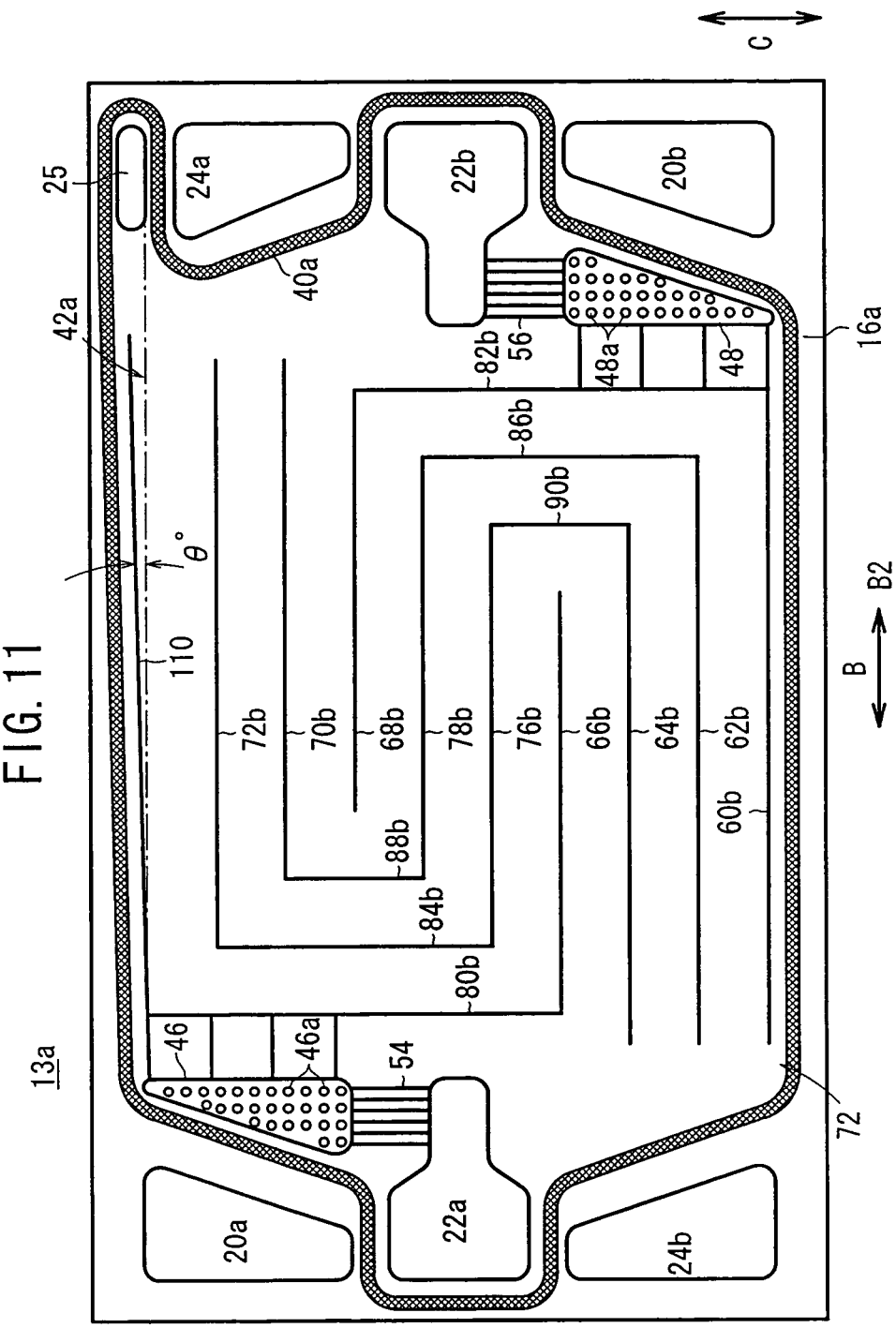
FIG. 11 is a front view showing a metal separator of a fuel cell according to a second embodiment of the present invention.
Figure 12:
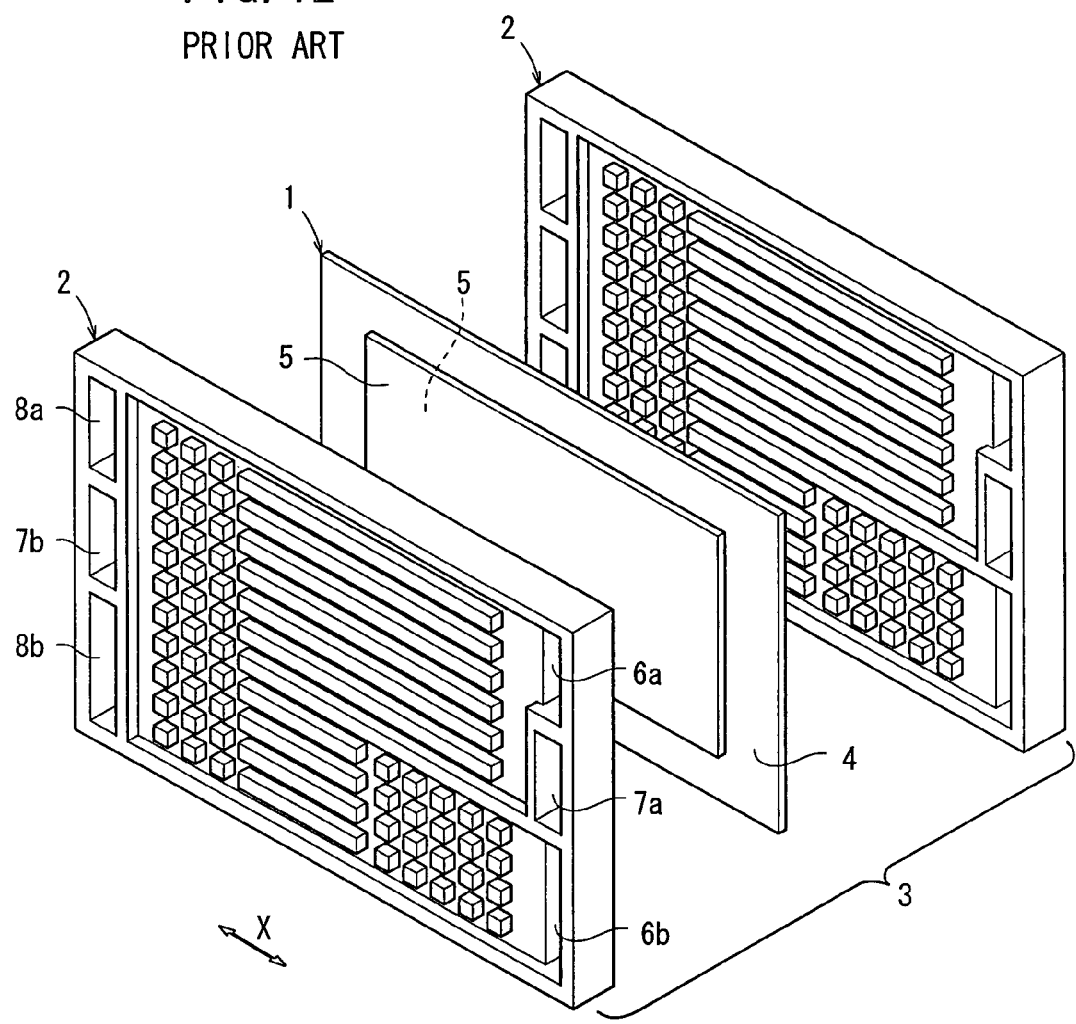
FIG. 12 is an exploded perspective view showing a conventional fuel cell.

FIG. 11 is a front view showing a metal separator 13a of a fuel cell according to a second embodiment of the present invention. In FIG. 11, the constituent elements that are identical to those of the fuel cell 10 according to the first embodiment are labeled with the same reference numeral, and description thereof is omitted. In the second embodiment, a coolant flow field 42a is formed on a metal separator 13a. A straight flow groove 110 as part of the top (uppermost portion) of the coolant flow field 42a extending in the direction indicated by the arrow B2 is inclined upwardly toward the air-releasing passage 25 at a predetermined angle θ°.

Thus, in the second embodiment, air moves in the direction indicated by the arrow B2, and upwardly along the inclined flow groove 110 at the top of the coolant flow field 42a. Therefore, the air is collected reliably and smoothly from the air-releasing passage 25. Since the air is discharged into the air-releasing passage 25 smoothly, the desired power generation performance of the overall fuel cell can be maintained.

In the fuel cell according to the present invention, the air-releasing passage extends through the separator at a position above the coolant discharge passage of the separator. At least part of the air releasing passage is positioned above the top of the coolant flow field. Therefore, the air in the coolant flow field is smoothly and reliably discharged into the air-releasing passage for preventing the air from being trapped in the coolant flow field. Thus, the coolant can be supplied to substantially the entire surface of the coolant flow field. With the simple structure, the cooling efficiency of the fuel cell is improved dramatically.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising:
an electrolyte electrode assembly including a pair of electrodes and an electrolyte interposed between said electrodes;
separators for sandwiching said electrolyte electrode assembly,
wherein the separator is in an upright position and a width of the separator is greater than a height of the separator,
wherein a reactant gas supply passage, a reactant gas discharge passage, a coolant supply passage, and a coolant discharge passage extend through said fuel cell in a stacking direction of said fuel cell;
a coolant flow field is formed along a surface of said separator and extends along a portion of said surface that corresponds to a power generation surface of said electrolyte electrode assembly, wherein said coolant flow field connects said coolant supply passage to said coolant discharge passage;
said coolant supply passage is provided at a middle position of one vertical end of said separator, and said coolant discharge passage is provided at a middle position of the other vertical end of said separator; and
an air-releasing passage connected to said coolant flow field for releasing air from said coolant flow field is formed at an upper position of the other vertical end of said separator such that at least part of said air-releasing passage is positioned above a top of said coolant flow field,
wherein said coolant flow field is in fluid communication with said coolant supply passage, said coolant discharge passage and said air-releasing passage on a single surface of said separator,
wherein said separator includes first and second metal plates which are stacked together, and said coolant flow field is formed between said first and second metal plates,
wherein said coolant flow field is in contact with said first and second metal plates,
wherein said air-releasing passage is positioned above said coolant discharge passage at the other vertical end of the separator,
wherein the air-releasing passage is aligned with the coolant discharge passage on the same side of the separator as the coolant discharge passage is positioned.

2. A fuel cell according to claim 1, wherein at least the top of said coolant flow field is inclined upwardly toward said air-releasing passage.

3. A fuel cell according to claim 1, wherein said first metal plate has an oxygen-containing gas flow field in a serpentine pattern on a surface opposite to said coolant flow field, and said second metal plate has a fuel gas flow field in a serpentine pattern on a surface opposite to said coolant flow field.

4. A fuel cell according to claim 1, wherein said reactant gas supply passage comprises an oxygen-containing gas supply passage and a fuel gas supply passage, and said reactant gas discharge passage comprises an oxygen-containing gas discharge passage and a fuel gas discharge passage; and
said oxygen-containing gas supply passage and said fuel gas supply passage are provided at lower positions of opposite vertical ends of said separator, and said oxygen-containing gas discharge passage and said fuel gas discharge passage are provided at upper positions of opposite vertical ends of said separator.

* * * * *